United States Patent [19]

Drissler

[11] Patent Number: 5,329,120
[45] Date of Patent: Jul. 12, 1994

[54] REDUNDANT OPTICAL DEFLECTION SENSOR HAVING SEPARATE MASSES

[75] Inventor: Friedrich Drissler, Stuttgart, Fed. Rep. of Germany

[73] Assignee: Stribel GmbH, Frickenhausen, Fed. Rep. of Germany

[21] Appl. No.: 617,523

[22] Filed: Nov. 23, 1990

[30] Foreign Application Priority Data

Nov. 27, 1989 [DE] Fed. Rep. of Germany ....... 3939150
Jul. 5, 1990 [DE] Fed. Rep. of Germany ....... 4021455

[51] Int. Cl.$^5$ ............................................. G01D 5/34
[52] U.S. Cl. ................ 250/231.1; 73/517 R; 73/510
[58] Field of Search ........... 250/231.1, 231.14, 227.14, 250/231.13, 231.19; 341/13; 73/516 R, 517 R, 517 A, 510

[56] References Cited

U.S. PATENT DOCUMENTS

| | | | |
|---|---|---|---|
| 4,338,517 | 7/1982 | Perrine | 250/231.14 |
| 4,451,730 | 5/1984 | Brogardh et al. | 250/231.13 |
| 4,492,860 | 1/1985 | Brogardh et al. | 250/231.13 |
| 4,819,486 | 4/1989 | Kunkel et al. | 73/517 R |
| 5,142,485 | 8/1992 | Rosenberg et al. | 73/510 |

FOREIGN PATENT DOCUMENTS

| | | |
|---|---|---|
| 0240023 | 10/1987 | European Pat. Off. . |
| 962473 | 10/1956 | Fed. Rep. of Germany . |
| 2034344 | 1/1972 | Fed. Rep. of Germany . |
| 2746279 | 11/1979 | Fed. Rep. of Germany . |
| 3007462 | 10/1980 | Fed. Rep. of Germany . |
| 3208512 | 9/1982 | Fed. Rep. of Germany . |
| 3230615 | 2/1984 | Fed. Rep. of Germany . |
| 3403887 | 8/1985 | Fed. Rep. of Germany . |
| 3733549 | 9/1989 | Fed. Rep. of Germany . |
| 56-69512 | 6/1981 | Japan . |
| 61-13110 | 1/1986 | Japan . |

Primary Examiner—David C. Nelms
Assistant Examiner—S. B. Allen
Attorney, Agent, or Firm—Barry R. Lipsitz

[57] ABSTRACT

In order to improve a sensor comprising an emitting element emitting a bundle of light rays in a direction of propagation, a receiving element receiving the bundle of light rays and having at least one receiving surface for the bundle of light rays, and an evaluating device generating an output signal of the sensor, such that exact determination of the deflection and the direction of deflection is possible, it is proposed that in each deflection position, a receiving surface be illuminated by only a partial bundle of rays of the bundle of light rays in the direction of deflection, that the receiving element generate for the receiving surface an integral intensity signal corresponding to the total intensity impinging upon this receiving surface and that the evaluating device detect the intensity signal and determine the deflection with a processor.

51 Claims, 4 Drawing Sheets

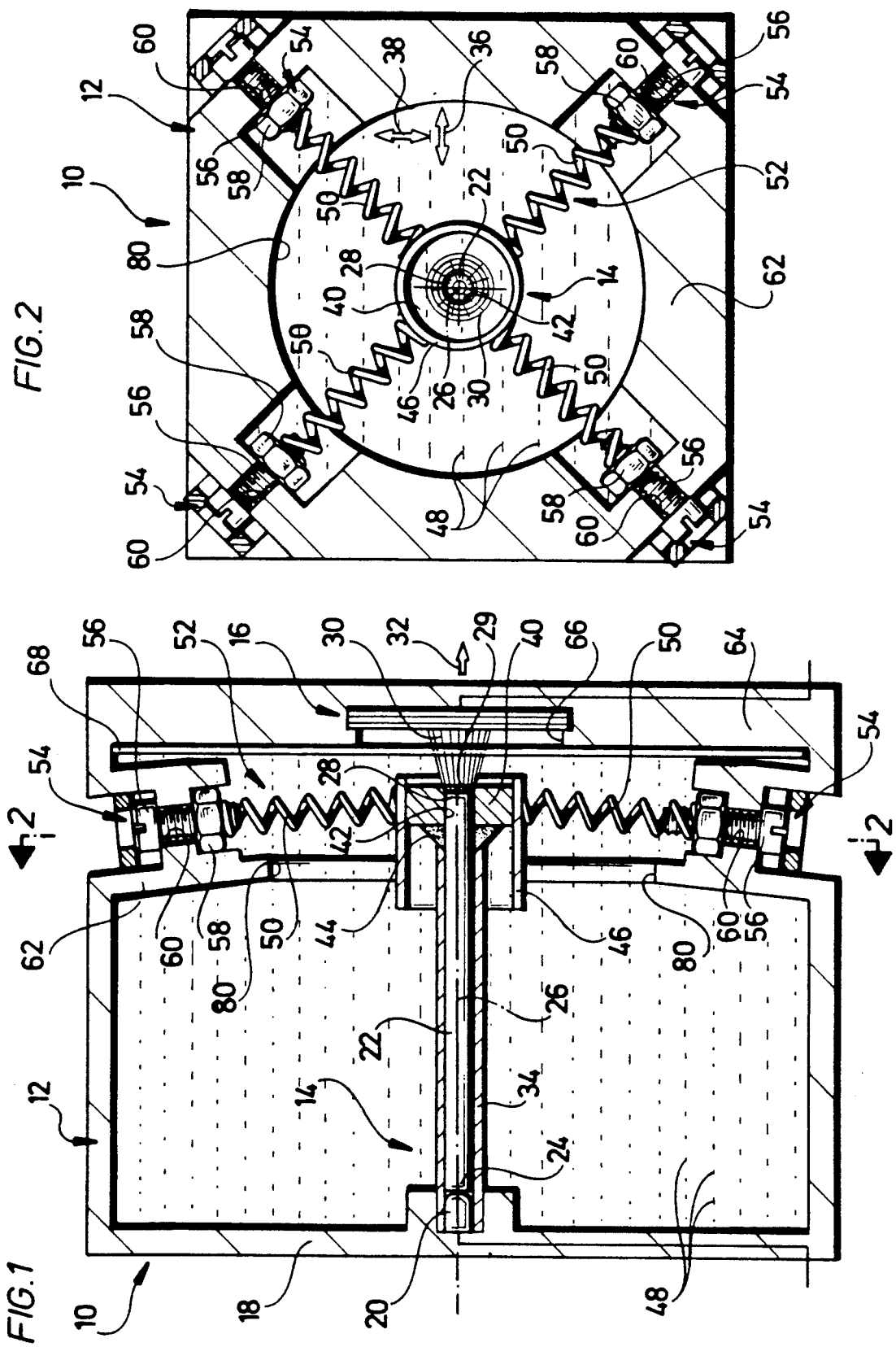

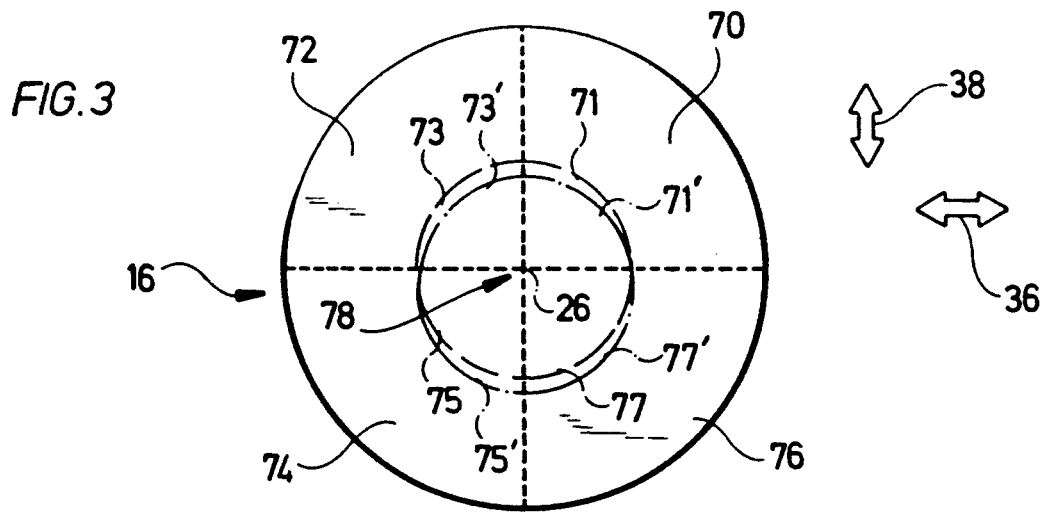
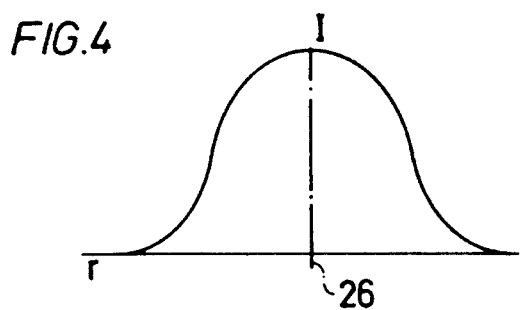
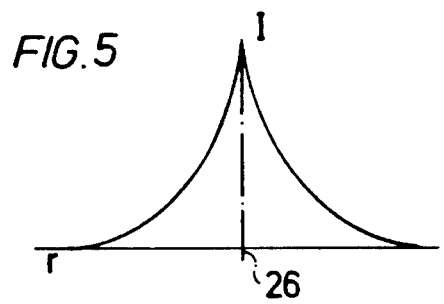
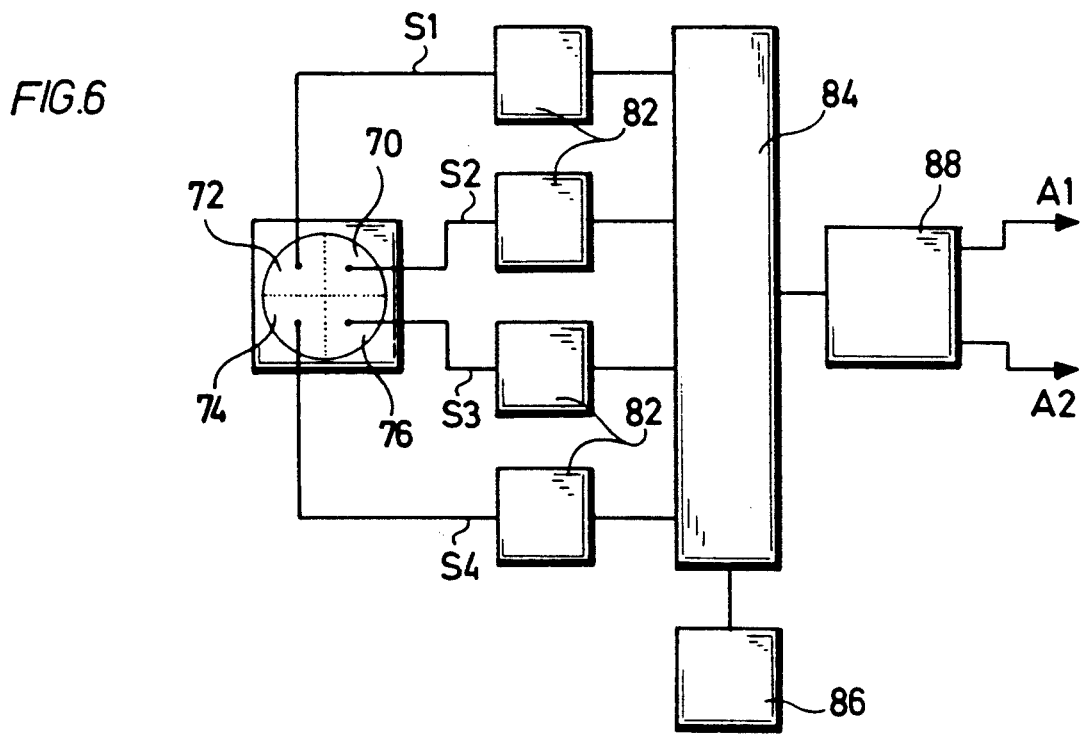

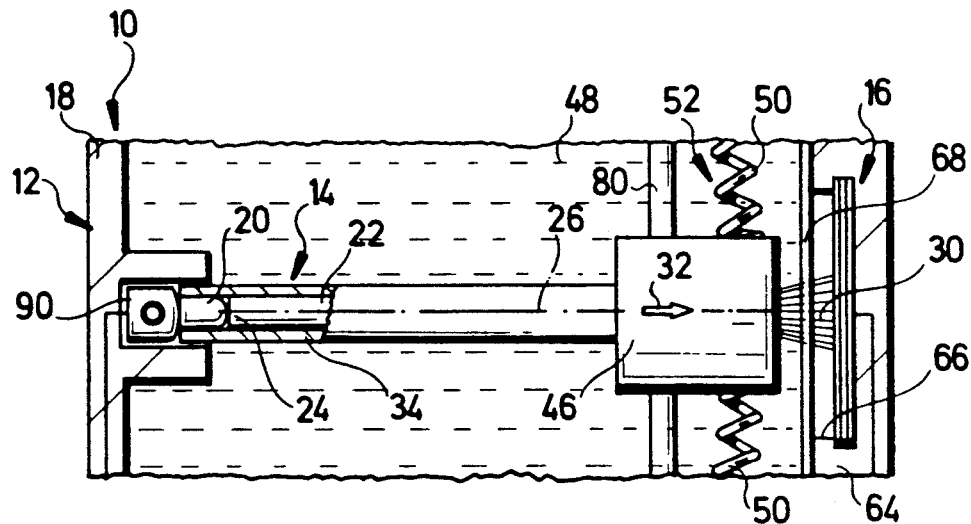
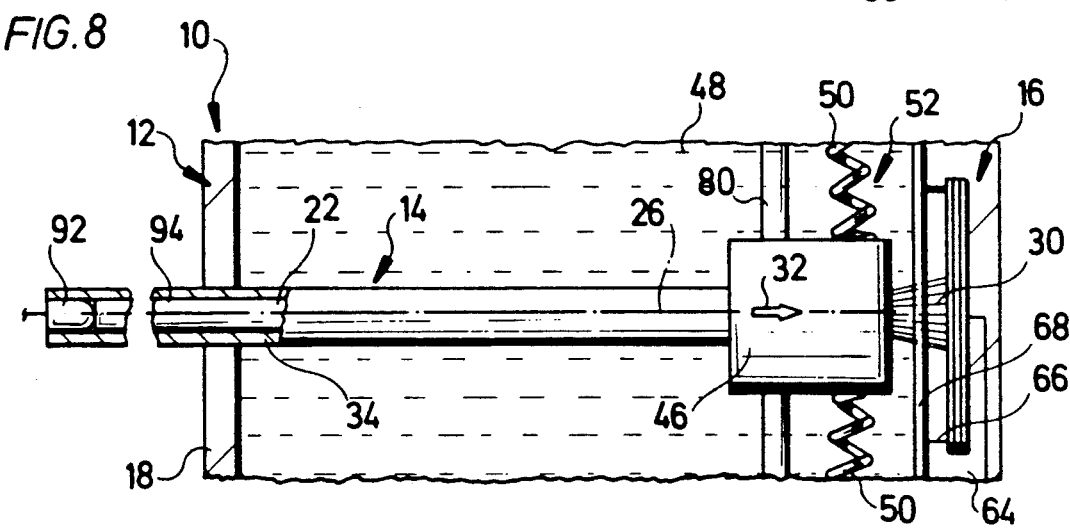
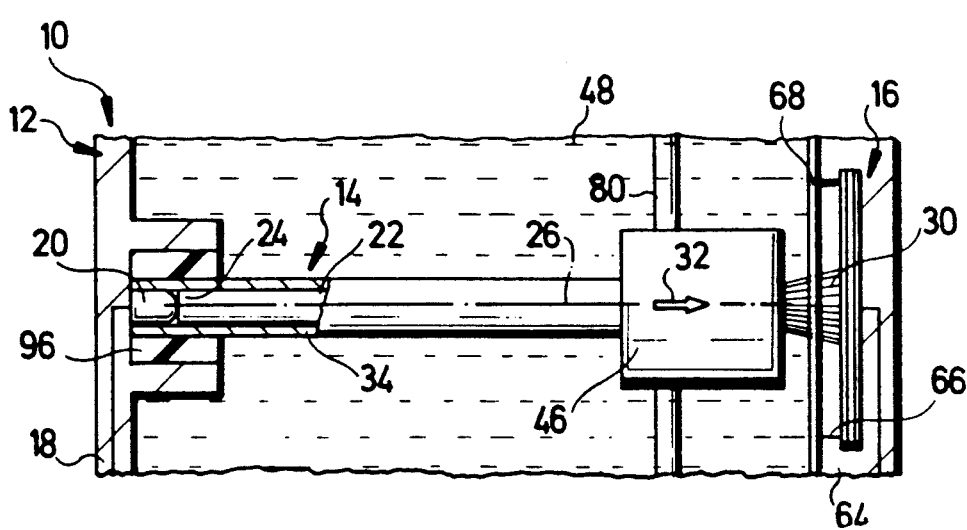

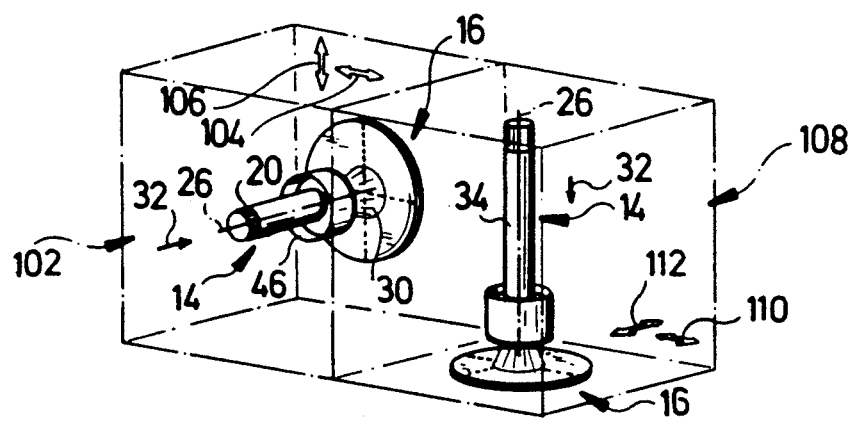
FIG. 10
FIG. 11
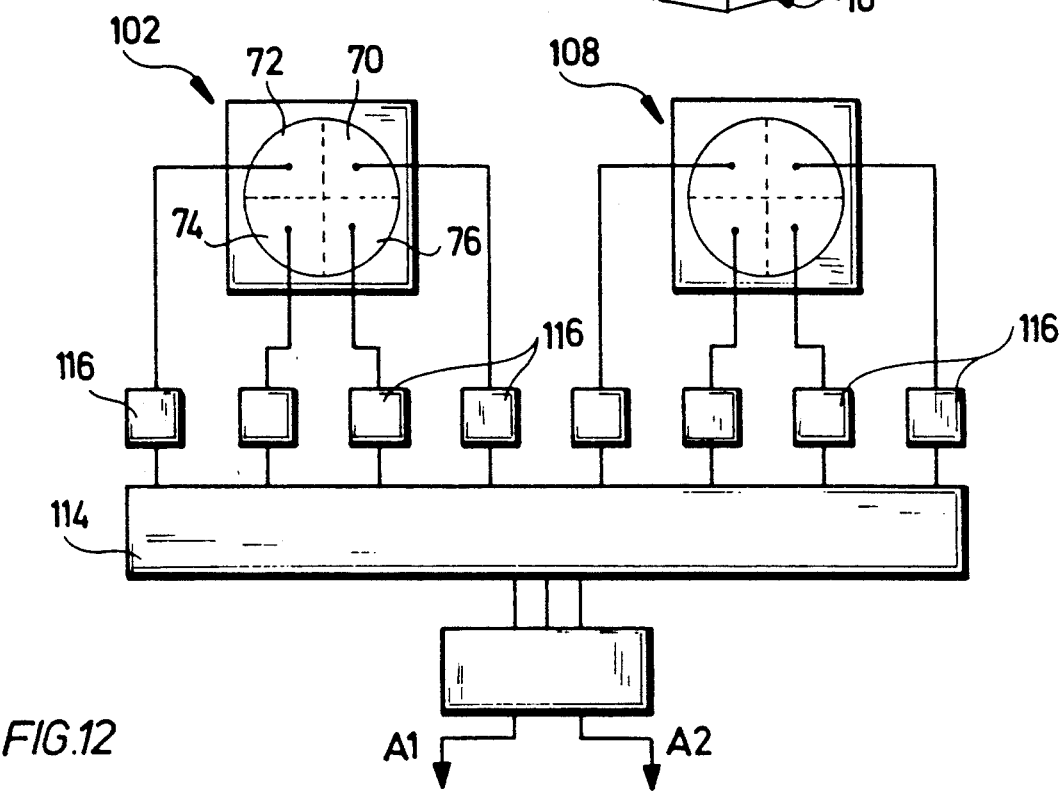
FIG. 12
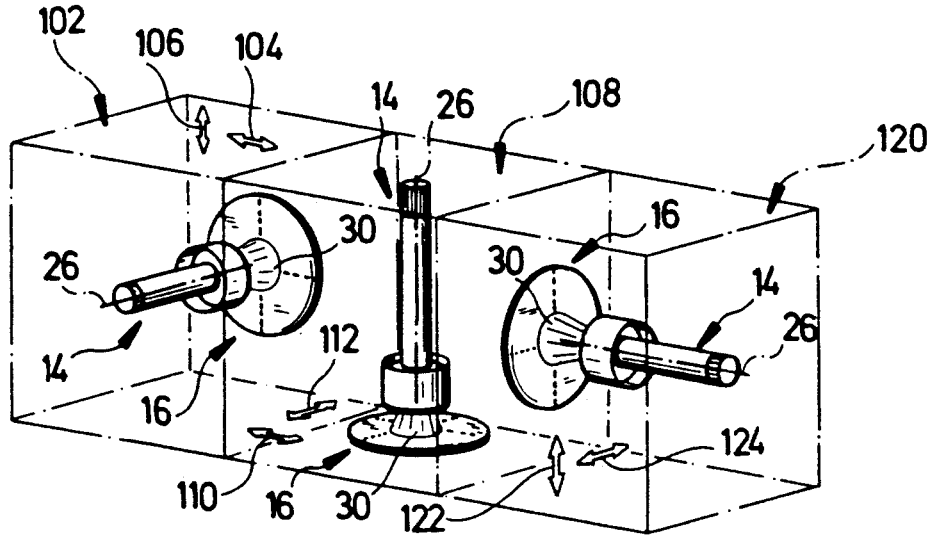

REDUNDANT OPTICAL DEFLECTION SENSOR HAVING SEPARATE MASSES

BACKGROUND OF THE INVENTION

The invention relates to a sensor comprising an emitting element emitting a bundle of light rays in a direction of propagation, the bundle of light rays having transversely to its direction of propagation a distribution of intensity which varies over its cross-section, a receiving element receiving the bundle of light rays and having at least one receiving surface for the bundle of light rays, the emitting element being so arranged relative to the receiving element that when the sensor is acted upon, the emitting element is movable relative to the receiving element in a direction of deflection transversely to the direction of propagation of the bundle of light rays, and an evaluating device generating an output signal of the sensor.

Such a sensor is known from DE-OS (German published patent application) 32 30 615. In accordance with one embodiment, this sensor is provided with an emitting element in the form of a light guide which emits the bundle of light rays and is movable when the sensor is acted upon and with a receiving element which receives the bundle of light rays via a light wave guide which then conducts the received light to a detector. A further embodiment comprises a stationary emitting element in the form of either a lamp or a lamp with a light guide and a receiving element including a movable light guide which conducts the light to the detector. All of the embodiments according to DE-OS (German published patent application) 32 30 615 are designed such that one or several photosensors receive a light intensity which is dependent on the deflection of the movable light guide, but the way of evaluating the light intensity so as to obtain an output signal is not discussed.

In DE-OS (German published patent application) 32 30 615, it is not disclosed how an exact measurement is to be carried out in order to determine the deflection and the direction of deflection.

The object underlying the invention is, therefore, to so improve a sensor of the generic kind that the deflection and the direction of deflection can be determined precisely.

SUMMARY OF THE INVENTION

This object is accomplished in accordance with the invention with a sensor of the kind described at the beginning in that in each deflection position, a receiving surface is illuminated by only a partial bundle of rays of the bundle of light rays in the direction of deflection, in that the receiving element generates for the receiving surface an integral intensity signal corresponding to the total intensity impinging upon this receiving surface, in that the evaluating device detects the intensity signal and determines the deflection with a processor which takes into account the size of the intensity signal and a predetermined set of parameters based on the distribution of intensity in the bundle of light rays and on the size and position of the receiving surface.

Hence in contrast with the solution according to DE-OS (German published patent application) 32 30 615, the inventive solution offers a preferred possibility of exactly determining the deflection and direction of deflection of the emitting element relative to the receiving element.

The one essential point in the precise determining of the deflection and direction of deflection is that a receiving surface is illuminated by only a partial bundle of rays of the bundle of light rays in the direction of deflection. Hence the measuring sensitivity with a distribution of intensity which varies over the cross-section of the bundle of light rays is considerably increased as merely a slight displacement of the bundle of light rays relative to the receiving surface acted upon changes the respective partial bundle of rays received by the receiving surface and hence also the integral intensity detected by this receiving surface. The further essential point in the precise determining of the deflection is that the intensity signal is evaluated with an evaluating device comprising a processor which in determining the deflection takes into account the distribution of intensity in the bundle of light rays and the size and position of the receiving surface as parameters and, therefore, the evaluating device is, in particular, able to accurately evaluate the size of the intensity signal which does not vary linearly with the displacement of the bundle of light rays relative to the receiving surface acted upon. Hence the evaluating device can precisely determine the deflection and the direction of deflection independently of the size of the displacement of the bundle of light rays relative to the receiving surface receiving the partial bundle of rays and can generate a highly precise output signal corresponding to these data.

With the inventive solution, the size of the deflection can, in principle, be accurately determined with one receiving element. However, it is even better, particularly in order to determine larger deflections in one direction or deflections in two directions perpendicular to each other, for the receiving element to comprise several separate receiving surfaces, the intensity signals of which are individually detected by the evaluating device. In accordance with the invention, it is merely necessary, in the case of these several receiving surfaces, for always one of the receiving surfaces to be acted upon by a partial bundle of rays of the bundle of light rays.

In particular, in order to determine large deflections in one direction more accurately, it is advantageous for at least two receiving surfaces to be arranged successively in the direction of deflection, but it is adequate for one of the receiving surfaces to be acted upon by a partial bundle of rays of the bundle of light rays.

To enable precise determining of large deflections in a plane of deflection spread over two different directions of deflection, for example, two directions of deflection extending at an angle to each other, provision is made for at least two receiving surfaces to be arranged in succession in two predetermined directions of deflection extending at an angle to each other so that in addition to the size of the deflection, the direction of deflection and, in particular, also deflections whose direction of deflection constitutes a combination of the two predetermined directions of deflection can be determined with a high degree of accuracy.

In a particularly preferred embodiment, provision is made for at least two receiving surfaces to be arranged in succession in each direction of deflection of the plane of deflection spread over two predetermined directions of deflection. As explained in connection with all of the aforesaid embodiments, an exact determining of the deflection position is possible in accordance with the invention when at least one receiving surface is acted upon by a partial bundle of rays of the bundle of light rays. However, the deflection and, in particular, the direction of deflection can be determined even more accurately when in each deflection position at least two of the receiving surfaces are illuminated by different partial bundles of rays of the bundle of light rays as the intensity signals of both receiving surfaces can then be used to determine the deflection and the direction of deflection.

Within the scope of the embodiments of the inventive solution described hereinabove, it is possible to arrange several photodetectors alongside one another as receiving surfaces in the receiving element. However, in order for the resolution of the path and the direction to be as large as possible, it is advantageous for the receiving element to be a photodetector which comprises several receiving surfaces as the resolution losses therein resulting from the spacings between the receiving surfaces are very low relative to one another.

In the simplest case, provision is made in accordance with the invention for the photodetector to be a quadrant diode with four receiving surfaces corresponding to the four quadrants of a right-angled system of coordinates.

In the description of the embodiments hereinabove, it was not discussed whether the bundle of light rays should impinge directly on the receiving surface of the receiving element or whether optical elements can be interposed therebetween. In accordance with the basic principle underlying the present invention, it is quite conceivable for optical transmission elements, for example, light guides to be connected with the receiving surfaces of the receiving element. Many optical transmission elements, for example, light guides or lenses behave in such a way that their light-transmitting properties are dependent on the angle of incidence. In this case, the optical transmission elements are disadvantageous for the high resolution of the inventive sensor as with such interposed transmission elements, the intensity varies with the deflection not only owing to the varying distribution of intensity over the cross-section of the bundle of light rays but also owing to angles of tilt between the direction of propagation of the bundle of light rays and the preferred direction of transmission of these transmission elements and so there is an additional, different transmission of light depending on the angle of incidence to the receiving surfaces.

Consequently, for an evaluation of the light intensity impinging upon the respective receiving element which is as simple and accurate as possible, it is preferable for the receiving element to be designed so as to generate for each receiving surface an intensity signal which is independent of the angle of incidence to the respective receiving surface, i.e., optical transmission elements may be connected to the receiving surface, but these optical transmission elements must be designed such that their transmitting properties, in particular their transmission of the intensity onto the receiving surface are independent of the angle of incidence.

In order to avoid the variations in intensity owing to different angles of tilt, it is, furthermore, expedient for each receiving surface to be formed by light-sensitive detector material which can be acted upon by the bundle of light rays free from transmission elements which are dependent on the direction of the radiation.

In the description of the embodiments hereinabove, the design of the emitting element was not specified in detail. In a preferred embodiment, the emitting element comprises a light guide and a light source arranged at a first end thereof and the bundle of light rays emerges at a second end of the light guide. This type of design of the emitting element has the great advantage that the light guide assumes the function of shaping the bundle of light rays and, on the other hand, captures the light emitted by the light source in a characteristic aperture angle region.

Several variants are conceivable for the design of the light guide. In one variant, provision is made for the light guide to comprise a light-conducting fiber and it is, for example, conceivable for the light guide to be made up of a bundle of light-conducting fibers.

It is, however, particularly advantageous, especially in order to achieve a very defined distribution of intensity over the cross-section of the bundle of light rays, for the emitting element to comprise a single light-conducting fiber.

To enable the displacement of the emitting element relative to the receiving element, provision is expediently made for the light guide to be flexurally elastic.

A light guide made of polymer material constitutes a particularly preferred embodiment of a light guide.

Alternatively or supplementarily to the flexurally elastic design of the light guide, it is conceivable for the light guide to be mounted for swivel motion on a joint, preferably a universal joint or a ball-and-socket joint.

As a further alternative, it is possible for the light guide to be held in an elastic bearing element.

In the description of the embodiments hereinabove, it was not discussed how large the aperture angle of these light guides is to be. In a preferred embodiment of a light guide, provision is made for an aperture angle for the bundle of light rays to be $>30$ degrees, however, it is even better for the bundle of light rays to have an aperture angle of $>45$ degrees. Hence, firstly, the requirement that a receiving surface be acted upon by only a partial bundle of rays is met in a simple way and, secondly, the requirement that there be a minimal spacing between the front end of the light guide and the receiving surface is fulfilled, which, in turn, contributes towards increasing the accuracy of the deflection measured by the sensor.

In order to protect the sensor from outside influences, provision is made for the light guide to be enclosed by a preferably light-proof sheath which is capable of shielding the light guide from its environment in every respect, in particular from stray light.

In this case, it is similarly expedient for the sheath of the light guide to be flexible transversely to the longitudinal axis and to preferably be resistant to compression in the longitudinal direction.

The type of the light source was also not discussed in detail. In a preferred solution of the invention, provision is made for the light source to comprise a light-emitting diode.

In the description of all of the embodiments of the inventive sensor hereinabove, it was not explained how relative displacement between emitting element and receiving element should be brought about. In a preferred application of the inventive sensor, provision is made for the relative displacement between emitting element and receiving element to be brought about by a force acting on a sensor mass. In particular, this may be a force of inertia.

A solution is preferred wherein the sensor mass acts on the emitting element.

In this case, it is expedient for the light guide to be acted upon in order for the sensor to generate the output signal and, in particular it is the second end of the light guide opposite the light source that is acted upon.

In a particularly preferred embodiment of an inventive sensor, the emitting element is arranged in an interior of a housing.

In the description of the embodiments hereinabove, it was not discussed how the emitting element is to be held in its initial position. Purely theoretically, it would be sufficient for the emitting element, for example, when it comprises a light guide, to be held in the initial position by its inherent rigidity. It is, however, even better for the emitting element to be held in the initial position by a stabilizer.

It has proven expedient for the stabilizer to take the form of an elastic element.

It is particularly expedient, in the case of a force sensor, in particular an inertia sensor, for the stabilizer to engage the sensor mass and to be supported on the housing.

To enable defined fixing of the initial position, provision is made for the stabilizer to include an adjustment element.

In a preferred embodiment, the stabilizer comprises several stabilizer elements arranged at equal angular spacings around the longitudinal axis of the light guide.

In the description of the embodiments hereinabove, it was not explained how an undesirably large relative displacement is avoided between emitting element and receiving element. To this end, a stop for delimiting the deflection of the emitting element is expediently arranged on the housing.

In the description of all of the embodiments hereinabove, it was also not explained how overshooting of the relative displacement between emitting element and receiving element is avoided. To this end, a damping medium is preferably provided for damping the deflection.

The coupling between the deflectable element and the damping medium is preferably effected by the deflectable element being connected to a displacement body for displacing the damping medium.

To achieve more precisely defined initial and end positions in all of the embodiments of the inventive sensor, provision is expediently made for the emitting element and the receiving element to be adjustable relative to each other.

In this connection, it is particularly favorable for the emitting element and the receiving element to be adjustable relative to each other in the direction of propagation of the bundle of light rays.

In the description of all of the embodiments hereinabove, the type of design of the evaluating device was not discussed in detail. In particular, it was not explained in detail how the evaluation is to be carried out.

In a particularly preferred embodiment of the inventive sensor, provision is made for the intensity signals of each receiving surface in different deflection positions to be prestored as supporting points in the evaluating device and for the given deflection to be determined by comparison with the supporting points. The advantage of this solution is that all non-linear relations between the deflection and the change in the intensity signals are eliminated as merely a field of supporting points taking all these relations into account is prestored in the evaluating device as orientation for the evaluating device when measuring the intensity signals which are compared with the field of supporting points to determine the deflection.

In order not to have to place the supporting points very densely, and yet achieve a good resolution, provision is expediently made for the deflection to be determined by interpolation between the supporting points.

As an alternative to this, an evaluation is, however, conceivable when the set of parameters includes the parameters for the distribution of intensity of the bundle of light rays varying transversely to the direction of propagation and the parameters for the size and position of the receiving surface. In this case, these data are used to make a calculation for each deflection on the basis of a stored, arithmetical relationship which links the distribution of intensity and the parameters with one another, with the measured intensity signals forming the basis for this calculation.

Hence there is no need for any supporting points to be prestored, but instead merely the initial position is prestored and all of the deflections are determined with a computational program based on the prestored values.

With this type of evaluation, it has proven expedient for the set of parameters for defining a deflection position to include a value for the maximum intensity signal of the respective receiving surface.

In the description of the embodiments hereinabove, it was also not specified which type of output signals are to be generated by the evaluating device. In an advantageous embodiment, provision is made, for example, in the case of an inertia sensor, for the evaluating device to generate an output signal corresponding to an acceleration of the sensor.

In all methods of calculation wherein use is not made of a field of supporting points, but instead the calculation of the deflection is carried out on the basis of the above-mentioned parameters, it is, furthermore, expedient for the evaluating device to take the modulus of elasticity of the light guide into account.

Insofar as a stabilizer is provided, it is also advantageous for the evaluating device to take the modulus of elasticity of the stabilizer in the direction of deflection into account, in particular when a force corresponding to the acceleration is to be measured.

Since the inventive sensor can be designed not only as such to detect a one-dimensional action, but, in particular also as sensor for actions whose directions of action lie in a plane of deflection, it is similarly desirable for the evaluating device to detect not only the deflection on the basis of an initial position, but also simultaneously the direction of deflection in relation to a reference direction and to generate a corresponding direction signal.

The design of the evaluating device itself was not discussed hereinabove. A design has proven particularly advantageous wherein the evaluating device comprises a read-only memory for the parameters which is associated with the processor. This read-only memory is, for example, an exchangeable and preprogrammed read-only memory element.

In the designing of the evaluating device, it has proven expedient for the intensity signal to be converted by an analog-to-digital converter and transmitted to the processor.

In view of the fact that the inventive sensor including its evaluating device is to be as compact as possible, provision is advantageously made for the processor to be a microprocessor.

This microprocessor is, for example, designed so as to drive a power stage for generating the output signal.

In addition to the inventive sensor described hereinabove, a further object underlying the invention is to create a redundant sensor which is considerably more reliable with respect to its indication than the sensors known so far.

This object is accomplished by at least two sensors detecting directions of deflection which extend at an angle transversely to one another and generating output signals corresponding to the deflection are arranged such that a first direction of deflection of the one sensor lies parallel to that of the other sensor, and by an evaluating device being provided for generating an overall output signal in the event that output signals of the sensors for the first direction of deflection are identical. The sensors forming the redundant sensors are preferably designed to include one or several of the aforesaid features.

Hence the advantage of the inventive solution is to be seen in that the two sensors each detect the first deflection jointly and so one can check whether one of the sensors is giving an erroneous indication or not. This is highly advantageous particularly with sensitive measurements which must not contain any errors.

It is particularly expedient for the evaluating device to report an error in the event that the output signals for the first direction of deflection are not identical. Hence, in this embodiment, in addition to the elimination of measurement errors, there is a constant check on the work of the two sensors in that in the event of differing output signals which do not result in an overall output signal, an error is immediately reported to indicate that one of the sensors is no longer working properly.

The embodiment comprising two sensors detecting first directions of deflection is preferably of such design that the sensors are arranged such that the second directions of deflection extend at an angle transversely to each other so that the redundant sensor made up of two sensors detects the first deflection redundantly, while the second directions of deflection of the two sensors each detect a direction of their own and no redundant signals are generated for these directions. Such a redundant sensor is advantageous when, for example, one spatial direction is to be measured with the utmost reliability, while a simple measurement is sufficient for the other two spatial directions. It is to be assumed that when the two output signals for the first direction of deflection are not identical, the defective sensor is also operating wrongly with respect to its second direction of deflection and so in the event of an error report relating to the first direction of deflection, the output signals for the second direction are also blocked and an error is reported. Hence a check is simultaneously carried out on the functioning of the respective sensor for the second direction of deflection although no separate counter check is made in this second direction of deflection.

Within the scope of the inventive solution, a redundant sensor is, however, particularly advantageous wherein three sensors each detecting two directions of deflection which extend at a right angle to each other and generating output signals corresponding to the deflection are arranged such that both directions of deflection of one sensor each extend parallel to a respective direction of deflection of one of the other sensors. This ensures that the redundant sensor carries out a check on itself in all three spatial directions.

Further features and advantages of the invention are to be found in the following description and the appended drawings of several embodiments.

BRIEF DESCRIPTION OF THE DRAWINGS

FIG. 1 a longitudinal section through a first embodiment;

FIG. 2 a cross-section through the first embodiment along line 2—2 in FIG. 1;

FIG. 3 a plan view of an embodiment of an inventive receiving element;

FIG. 4 an illustration of the distribution of the intensity in the bundle of light rays under far field conditions;

FIG. 5 an illustration of the distribution of the intensity in the bundle of light rays under near field conditions;

FIG. 6 a schematic illustration of an evaluating device for the first embodiment;

FIG. 7 a longitudinal section similar to FIG. 1 through a second embodiment;

FIG. 8 a section similar to FIG. 1 through a third embodiment;

FIG. 9 a section similar to FIG. 1 through a fourth embodiment;

FIG. 10 a schematic illustration of a first embodiment of a redundant sensor limited to the illustration of the directions of deflection;

FIG. 11 a block diagram for a evaluating device for the first embodiment of the redundant sensor; and FIG. 12 a schematic illustration of a second embodiment of the redundant sensor similar to FIG. 10.

DETAILED DESCRIPTION OF THE INVENTION

A first embodiment, designated in its entirety 10, of an inventive sensor, illustrated in FIGS. 1 and 2, comprises an optically dense housing 12 in which an emitting element, designated in its entirety 14, and a receiving element, designated in its entirety 16, are arranged for movement relative to each other.

The receiving element 16 is preferably fixedly arranged in the housing 12 and the emitting element 14 movable relative to the housing 12.

In accordance with the invention, the emitting element 14 comprises a light-emitting diode 20 held on a first side wall 18 of the housing 12. The light-emitting diode 20 emits light into a light guide, designated in its entirety 22 and preferably comprised of a single polymer fiber, at a first end 24 thereof. The light guide 22 extends with a longitudinal axis 26 transversely through an interior of the housing 12 in the direction towards the receiving element 16 and allows a bundle of light rays 30 to exit in a direction of propagation 32 at a second end 28. The bundle of light rays 30 impinges on the receiving element 16 with an aperture angle of approximately >25 degrees.

To protect the light guide 22 from chemical influences from the environment and from stray light, it is surrounded by a light-proof protective sheath 34 which also engages over the light-emitting diode 20 and terminates at the side wall 18 of the housing. The light guide is also protected at its second end 28 by a protective window 29 on the end face thereof.

Both the light guide 22 and the light-emitting diode 20 are firmly anchored on the side wall 18. The light guide 22 is flexibly movable with the protective sheath 34—as illustrated in FIG. 2—in both a first direction 36 and a second direction 38 perpendicular to the first and in all superpositions of these and so the second end 28 moves on a spherical surface around the anchoring point of the light guide 22.

A sensor mass 40 is held on the light guide 22 in the region of the second end 28. The light guide 22 preferably extends in a central bore 42 through the sensor mass 40. The sensor mass 40 is preferably attached by an adhesive 44 or welding. Furthermore, the sensor mass 40 is surrounded by a cylindrical displacement body 46 which serves to displace a damping medium 48 upon deflection of the second end 28 and to thereby damp the deflection movements of the second end 28 of the light guide 22. This displacement body 46 is preferably in the form of a hollow cylinder which surrounds the sensor mass 40 on an outer side thereof.

As illustrated, in particular in FIG. 2, a total of four stabilizer elements 50 extending in a perpendicular direction in relation to one another engage the sensor mass 40. These stabilizer elements 50 together form a stabilizer 52 which holds the second end 28 in an initial position when there is no force acting on it. The stabilizer elements 50 are preferably in the form of springs which are supported with their end facing away from the emitting element 14 on the housing 12. An adjustment member 54 is provided between the respective stabilizer element 50 and the housing to impart a desired pretension to each of the stabilizer elements 50.

The adjustment member 54 comprises a screw 56 which is rotatably mounted in the housing 12 and carries a nut 58 on which the individual springs serving as stabilizer elements 50 are supported. By turning the screw 56, the second fiber end 28 is displaceable in the direction towards the nut 58 or in the direction opposite thereto.

A bearing bore 60 is provided in a jacket 62 of the housing 12 as bearing for each screw 56.

The receiving element 16 is preferably a photodiode which is arranged in a side wall 64 of the housing 12 opposite the side wall 18, preferably in a recess 66 of the housing 12. The recess 66 is covered in the direction towards the damping medium 48 by a window 68.

As illustrated in FIG. 3, the photodiode may be a quadrant diode comprising a total of four quadrants 70, 72, 74 and 76, each forming a receiving surface. Each of the quadrants 70, 72, 74 and 76 is preferably divided into further receiving elements. The bundle of light rays 30 impinges on this photodiode, as likewise illustrated in FIG. 3, and so within a cross-sectional area 78 of the bundle of light rays 30, the receiving surfaces 70, 72, 74 and 76, insofar as acted upon, are illuminated. The bundle of light rays 30 still has within the cross-sectional area 78 a distribution of intensity $I(r)$ dependent on the radius r, which preferably assumes the shape of a curve, as illustrated in FIGS. 4 and 5. This distribution of intensity $I(r)$ within the cross-sectional area 78 depends on the aperture angle of the bundle of light rays 30 and on the spacing of the receiving element 16 from the second end 28 of the light guide 22. The shape of a bell-shaped curve (FIG. 4) corresponds to the distribution of intensity $I(r)$ at a larger spacing from the second end 28, whereas at a slight spacing from the second end 28, the distribution of intensity $I(r)$ follows the course illustrated in FIG. 5 within the cross-sectional area 78.

To limit the deflection of the second end 28, starting from the initial position, an annular stop rim 80, illustrated in FIGS. 1 and 2, is arranged in the region of the displacement body 46 in the housing 12 and extends in the circumferential direction coaxially with the longitudinal axis 26 in the initial position. The stop rim 80 limits the movements of the displacement body 46, starting from the initial position, in all directions of deflection 36 and 38 and in the combinations of the directions of deflection 36 and 38 to a maximum value.

In the preferred embodiment, the entire housing 12 is filled with the damping medium 48. Hence the light guide 22 extends throughout its full length therein, starting from its point of attachment at the side wall 18. The stabilizer elements 50 also lie in the damping medium, with the screws 56 extending in a sealed manner through the jacket 62 of the housing 12 in the region of their bearing bores 60 and likewise protruding into the damping medium 48 and carrying the nuts 58 in this region. Only the receiving element 16 and the second end 28 of the light guide 22 are screened off by the window 68.

The inventive embodiment of a sensor operates as follows:

In the force-free state, i.e., when the sensor is not acted upon, the emitting element 14 stands such that the second end 28 uniformly illuminates with the bundle of light rays 30 the individual quadrants 70, 72, 74 and 76 of the receiving element 16. This initial position is set accordingly by the stabilizer 52 with the stabilizer elements 50 and the adjustment members 54. In this initial position, each of the quadrants 70, 72, 74 and 76 is illuminated by a partial bundle of rays 71, 73, 75 and 77 of identical size of the bundle of light rays 30, with each quadrant 70, 72, 74 and 76 receiving the same intensity in the symmetrical distribution relative to the longitudinal axis 26 of the light guide 22.

If this sensor 10 is subjected to a force, preferably an acceleration, which acts on the mass 40 and exhibits a component lying in the plane spread over the first and second directions of deflection 36 and 38, a force is exerted by the sensor mass on the second end 28 of the light guide 22 against the force exerted by the stabilizer elements 50 on this second end 28 and hence displaces the second end 28, starting from the initial position in which the bundle of light rays 30 illuminates the same area in each of the quadrants 70, 72, 74 and 76, until a balance of forces occurs between the force exerted by the sensor mass 40 and the restoring force exerted by the stabilizer elements, into a deflection position which, as illustrated, for example, in dot-and-dash lines in FIG. 3, lies such that the largest area is illuminated in the quadrant 76 and increasingly smaller areas in the quadrants 70, 74 and 72. Moreover, owing to the distribution of the intensity in the bundle of light rays 30 according to FIG. 4 or FIG. 5, the intensity impinging on each quadrant 70, 72, 74 and 76 is not only proportional to the illuminated area of the respective quadrant 70, 72, 74 and 76 but additionally convoluted with the distribution of intensity $I(r)$.

In the deflection position illustrated in dot-and-dash lines, the bundle of light rays 30 is divided up into partial bundles of rays 71', 73', 75' and 77' of different sizes acting on the respective quadrants 70, 72, 74 and 76.

The size of the deflection and the direction of deflection can now be determined by comparison of the intensity signals of the individual quadrants 70, 72, 74 and 76 in the deflection position with the intensity signals in the initial position, with the size of the deflection in the two directions of deflection 36 and 38 resulting from comparison of the intensity signals of the quadrants succeeding one another in these directions 70 and 72 as well as 76 and 74, 74 and 72 as well as 76 and 70.

To generate an output signal corresponding to the deflection of the second end 28, as illustrated in FIG. 6, each quadrant 70, 72, 74 and 76 is designed so as to generate an integral intensity signal S1, S2, S3 and S4 proportional to the respective impinging intensity. Each of these intensity signals is converted in an analog-to-digital converter 82 into a digital signal and transmitted to a microprocessor 84. Associated with this microprocessor 84 is a read-only memory 86 in which the path of intensity within the bundle of light rays 30 and the position of the individual quadrants are stored as parameters for the evaluation of the intensity signals. With these parameters the microprocessor 84 is thus able to drive a power stage 88 such that the latter generates an output signal A1 which indicates the size of the deflection, starting from the initial position, and an output signal A2 which indicates the direction of the deflection in relation to the directions of deflection 36 and 38, respectively. These output signals A1 and A2 can be calculated in many different ways. It is, for example, conceivable to program the microprocessor such that it operates with a computation program which takes into account the distribution of intensity I(r) in the bundle of light rays 30 as well as the position of the quadrants 70 to 76 and the respectively measured, integral intensity signal S1 to S4, with the respective parameters being fixed in accordance with a calibration made during the manufacture of the inventive sensor.

As an alternative to this, it is, however, also conceivable to store in the read-only memory 86 representative values for the intensity signals S1 to S4 together with the values for the respective deflection in the form of supporting points and to allow the microprocessor 84 to merely carry out an interpolation program to precisely determine the deflection and direction of deflection after detection of the supporting points which are closest.

A second embodiment of the inventive sensor, illustrated in FIG. 7, is identical with the first embodiment insofar as its reference numerals are the same as in the first embodiment.

In contrast with the first embodiment, merely the light guide 22 with its protective sheath 34 is not flexible, but held on the side wall 18 by a rotary joint 90. The light-emitting diode 20 is preferably fixedly connected to the light guide 22 and hence likewise held on the side wall 18 for rotation about the rotary joint 90.

Otherwise, the second embodiment of the inventive sensor operates in the same way as the first embodiment. However the modulus of elasticity of the light guide 22 is no longer of any significance and the light guide 22 does not have to be flexible but can instead be rigid.

In a third embodiment, illustrated in FIG. 8, the emitting element 14 is of different design from that of the first embodiment in that a light source 92 thereof is arranged at a far distance from the housing 12 of the sensor and the light is introduced through a long light guide 94 which extends through the side wall 18 and protrudes into the housing 12 with an end piece 22 corresponding to the light guide 22 of the first embodiment.

This embodiment of a sensor represents a sensor which is integrated into a light guide network system wherein instead of the electric supply line for the light-emitting diode 20 the light is introduced through the light guide 94, for example, in the form of a flexible fiber.

Otherwise, the third embodiment is identical in design with the first embodiment insofar as the same reference numerals are used as in the first embodiment and so reference is to be had to the description of the first embodiment.

In a fourth embodiment, illustrated in FIG. 9, the light guide 22 is rigid in the same way as in the second embodiment according to FIG. 7 and held on the side wall 18 by means of an elastic element 96, for example, in the form of an elastic ring.

In the fourth embodiment, too, there is a stop rim 80 but no stabilizer 52. All these functions are assumed by the elastic element 96.

Insofar as the same reference numerals are used in the fourth embodiment as in the first embodiment, the parts are identical with those of the first embodiment and so reference is to be had to the statements thereon in connection with the first embodiment.

In a redundant sensor, illustrated in FIG. 10, there are, for example, two sensors according to one of the preceding embodiments arranged alongside one another. A first sensor 102 has the directions of deflection 104 and 106 and a second sensor 108 has the directions of deflection 110 and 112, the directions of deflection 104 and 110 being aligned parallel to each other.

The signals are evaluated, as illustrated in FIG. 11, for example, by a common microprocessor 114 which evaluates both the intensity signals of the first sensor 102 and of the second sensor 108 converted in analog-to-digital converters 116 and only generates an output signal with respect to the directions of deflection 104 and 110 when both sensors 102 and 108 indicate the same deflection in this direction, whereas the directions of deflection 106 and 112 are evaluated as in the case where sensors 102 and 108 are set up as individual sensors.

In a further embodiment of a redundant sensor, a third sensor 120 which responds to directions of deflection 122 and 124 is associated with the two sensors 102 and 108. In addition, the third sensor 120 is arranged such that the direction of deflection 122 extends parallel to the direction of deflection 106 and the direction of deflection 124 parallel to the direction of deflection 112 and the direction of deflection 104 parallel to the direction of deflection 110 and hence the microprocessor 114 which now evaluates the intensity signals of all three sensors one after the other, only generates an output signal for the respective direction of deflection when those two of the three sensors 102, 108 and 120 that are sensitive in this direction of deflection measure the same deflection signal.

This redundant sensor has the advantage that all sensors 102, 108 and 120 monitor one another mutually in all three spatial dimensions and hence no erroneous measurements occur.

The redundant sensor illustrated in FIG. 12 can, for example, be used for measuring acceleration in all three spatial directions.

The present disclosure relates to the subject matter disclosed in German applications No. P 39 39 150.7 of Nov. 27, 1989 and No. P 40 21 455.9 of Jul. 5, 1990, the entire specifications of which are incorporated herein by reference.

What is claimed is:

1. Sensor comprising an emitting element emitting a bundle of light rays in a direction of propagation, said bundle of light rays having transversely to its direction of propagation a distribution of intensity which varies over its cross-section, a receiving element receiving said bundle of light rays and having at least one receiving surface for said bundle of light rays, said emitting element being so arranged relative to said receiving element that when said sensor is acted upon, said emitting element is movable relative to said receiving element in a direction of deflection transversely to said direction of propagation of said bundle of light rays, and an evaluating device generating an output signal of said sensor, wherein:

in each deflection position, a receiving surface is illuminated by only a partial bundle of rays of said bundle of light rays in said direction of deflection, said receiving element generates for said receiving surface an integral intensity signal corresponding to the total intensity impinging upon this receiving surface, and said evaluating device detects said intensity signal and determines the deflection with a processor taking into account the size of said intensity signal and a predetermined set of parameters based on said distribution of intensity in said bundle of light rays and on the size and position of said receiving surface.

2. Sensor as defined in claim 1, wherein said receiving element has several separate receiving surfaces, the intensity signals of which are individually detected by said evaluating device.

3. Sensor as defined in claim 2, wherein at least two receiving surfaces are arranged in succession in said direction of deflection.

4. Sensor as defined in claim 3, wherein at least two receiving surfaces are arranged in succession in two predetermined directions of deflection extending at an angle to one another.

5. Sensor as defined in claim 2, wherein in each deflection position, at least two of said receiving surfaces are illuminated by different partial bundles of rays of said bundle of light rays.

6. Sensor as defined in claim 2, wherein said receiving element is a photodetector having several receiving surfaces.

7. Sensor as defined in claim 6 wherein said photodetector is a quadrant diode.

8. Sensor as defined in claim 1, wherein said receiving element is designed to generate for each receiving surface an intensity signal which is independent of the angle of incidence to the respective receiving surface.

9. Sensor as defined in claim 1, wherein each receiving surface is formed by light-sensitive detector material which can be acted upon by said bundle of light rays free from transmission elements which are dependent on the direction of the radiation.

10. Sensor as defined in claim 1, wherein said emitting element comprises a light guide and a light source arranged at a first end thereof, and in that said bundle of light rays emerges at a second end of said light guide.

11. Sensor as defined in claim 10, wherein said light guide comprises a light-conducting fiber.

12. Sensor as defined in claim 11, wherein said emitting element comprises a single light-conducting fiber.

13. Sensor as defined in claim 10, wherein said light guide is flexurally elastic.

14. Sensor as defined in claim 11, wherein said light guide is made of polymer material.

15. Sensor as defined in claim 1, wherein said light guide is mounted for swivel motion on a joint, preferably a universal joint or a ball-and-socket joint.

16. Sensor as defined in claim 1, wherein said light guide is held in an elastic bearing element.

17. Sensor as defined in claim 10, wherein said light guide has an aperture angle for said bundle of light rays of >25 degrees.

18. Sensor as defined in claim 1, wherein said light guide is enclosed by a preferably light-proof sheath.

19. Sensor as defined in claim 1, wherein said sheath of said light guide is flexible transversely to the longitudinal axis and preferably resistant to compression in the longitudinal direction.

20. Sensor as defined in claim 10, wherein said light source comprises a light-emitting diode.

21. Sensor as defined in claim 1, wherein the relative displacement between emitting element and receiving element is effected by an inertia force of a sensor mass.

22. Sensor as defined in claim 21, wherein said sensor mass acts on said emitting element.

23. Sensor as defined in claim 1, wherein it is said light guide that is acted upon in order for said sensor to generate said output signal.

24. Sensor as defined in claim 23, wherein it is said second end of said light guide opposite said light source that is acted upon.

25. Sensor as defined in claim 1, wherein said emitting element is arranged in an interior of a housing.

26. Sensor as defined in claim 1, wherein said emitting element is held in the initial position by a stabilizer.

27. Sensor as defined in claim 26, wherein said stabilizer is in the form of an elastic element.

28. Sensor as defined in claim 26, wherein said stabilizer engages said sensor mass and is supported on said housing.

29. Sensor as defined in claim 26, wherein said stabilizer comprises an adjustment element.

30. Sensor as defined in claim 26, wherein said stabilizer comprises several stabilizer elements arranged at identical angular spacings around said longitudinal axis of said light guide.

31. Sensor as defined in claim 1, wherein a stop is provided on said housing for delimiting the deflection of said emitting element relative to said receiving element.

32. Sensor as defined in claim 1, wherein a damping medium is provided for damping the deflection.

33. Sensor as defined in claim 32, wherein said deflectable element is connected to a displacement body for displacing said damping medium.

34. Sensor as defined in claim 1, wherein said emitting element and said receiving element are adjustable relative to each other.

35. Sensor as defined in claim 34, wherein said emitting element and said receiving element are adjustable relative to each other in said direction of propagation of said bundle of light rays.

36. Sensor as defined in claim 1, wherein said intensity signals of each receiving surface in different deflection positions are prestored in said evaluating device as supporting points, and in that the given deflection is determined by comparison with said supporting points.

37. Sensor as defined in claim 36, wherein said deflection is determined by interpolation between said supporting points.

38. Sensor as defined in claim 1, wherein said set of parameters includes the parameters for said distribution of intensity of said bundle of light rays varying transversely to said direction of propagation and the parameters for the position of said receiving surface.

39. Sensor as defined in claim 1 wherein said set of parameters includes a value for the maximum intensity signal of the respective receiving surface for defining a deflection position.

40. Sensor as defined in claim 1 wherein said evaluating device generates an output signal corresponding to an acceleration of said sensor.

41. Sensor as defined in claim 40, wherein said evaluating device takes the modulus of elasticity of said light guide into account.

42. Sensor as defined in claim 40, wherein said evaluating device takes the modulus of elasticity of said stabilizer in said direction of deflection into account.

43. Sensor as defined in claim 1, wherein said evaluating device detects said direction of deflection in relation to a reference and generates a corresponding direction signal.

44. Sensor as defined in claim 1, wherein said evaluating device comprises a read-only memory for said parameters which is associated with said processor.

45. Sensor as defined in claim 1, wherein said intensity signal is converted by an analog-to-digital converter and transmitted to said processor.

46. Sensor as defined in claim 1, wherein said processor is a microprocessor.

47. Sensor as defined in claim 1, wherein said processor drives a power stage which generates said output signal.

48. A redundant sensor assembly comprising:
a first sensor having a first detecting element for detecting a response of a first sensing element to a physical entity in a first and a second direction, said first and said second directions extending at an angle transversely to one another and said first sensor generating output signals corresponding to said directions;
at least a second sensor having a second detecting element for detecting a response of a second sensing element to said physical entity in a third and a fourth direction, said third and said fourth directions extending at an angle transversely to one another and said second sensor generating output signals corresponding to said directions;
said first and said second sensors being arranged such that said first and third directions are parallel; and
an evaluating device for generating an overall output signal only in the event that output signals of said sensors for said parallel directions are identical.

49. A redundant sensor assembly as defined in claim 48, wherein said evaluating device reports an error in the event that said output signals for said parallel directions are not identical.

50. A redundant sensor assembly as defined in claim 48, wherein said sensors are arranged such that said second direction and said fourth direction extend at an angle transversely to each other.

51. A redundant sensor assembly as defined in claim 48, wherein a third sensor having a third detecting element for detecting a response of a third sensing element to said physical entity in a fifth and sixth direction of detection is provided, said fifth and sixth directions of detection extending at a right angle to one another and generating output signals corresponding to said directions, all three sensors being arranged such that both directions of detection of one of said first, second and third sensors are parallel to one direction of said other two sensors.

* * * * *